United States Patent [19]

Hansen

[11] 4,140,250

[45] Feb. 20, 1979

[54] APPARATUS FOR SEPARATING AND DISPENSING SMALL, RIGID, ELONGATE ARTICLES

[76] Inventor: Harold V. Hansen, 23823 178th Ave. N., Cordova, Ill. 61242

[21] Appl. No.: 777,805

[22] Filed: Mar. 15, 1977

[51] Int. Cl.[2] .......... G01F 11/00

[52] U.S. Cl. .......... 222/410

[58] Field of Search .......... 222/410; 209/86, 288, 209/293; 193/10

[56] References Cited

U.S. PATENT DOCUMENTS

| | | | |
|---|---|---|---|
| 1,143,231 | 6/1915 | Schaefer | 209/86 |
| 2,374,948 | 5/1945 | Niederer et al. | 209/86 |
| 2,543,898 | 3/1951 | De Vaney | 209/288 |
| 3,285,476 | 11/1966 | Pellow et al. | 193/10 |

*Primary Examiner*—Allen N. Knowles
*Attorney, Agent, or Firm*—David H. Hill

[57] ABSTRACT

A separating and dispensing apparatus for small, rigid, elongate articles which continuously tumbles a mass of such articles to progressively separate articles from the mass and continuously dispenses the articles as separated.

13 Claims, 4 Drawing Figures

APPARATUS FOR SEPARATING AND DISPENSING SMALL, RIGID, ELONGATE ARTICLES

FIELD OF THE INVENTION

This invention pertains generally to dispensing apparatus, and more specifically to apparatus for continuously and progressively separating small, rigid, elongate articles from an entangled mass thereof and dispensing them in a continuous and controlled manner.

BACKGROUND OF THE INVENTION

The use of fibrous materials as a reinforcing means within a batch or mix of settable or hardenable material is well known. In ancient times straw fibers were utilized to reinforce sunbaked bricks. More recently, asbestos fibers have been used to reinforce portland cement mix, and glass fibers to reinforce plastics. However, it is only in the very recent past that fibers have been used to reinforce concrete and that fibrous concrete has become a practical reality.

Fibrous concrete comprises an ordinary concrete to which short, small diameter fibers have been added. Such fibers as asbestos, glass, plastics and steel have been employed in this manner, and the compressive strength of the resultant concrete may be one and one-half times greater than that of ordinary concrete, while the flexural strength may be increased by a factor of as much as two or two and one half.

The properties of fibrous concrete vary with such parameters as cement content, aggregate size, fiber geometry, the amount of fiber and the evenness of distribution of the fiber content. While the strength of fibrous concrete generally increases with increasing fiber content, the workability of the mix is severely impaired if the fiber content exceeds two percent, generally, of the volume of the mix. Thus, it is apparent that optimized fiber concrete characteristics necessitate a controlled and even flow of the fibers to the mix.

Steel fibers, the more common in use in fibrous concrete, typically are one-half to one and one-half inches in length and one to two hundredths of an inch in diameter, and they are commonly purchased in forty-pound boxes, the contents of which are manually separated and added to a cement mix, a time-consuming and expensive procedure, wholly lacking in uniformity of mix.

The prior art is replete with various forms of rotary drum devices for classifying or screening articles of all types. That is to say, the prior art abounds with rotary drum devices for separating two or more ingredients of an agglomeration where the several ingredients have different physical characteristics, such as size or shape. Examples of this type of prior art are U.S. Pat. Nos. 3,957,631; 3,200,945; 3,073,449; 2,717,692; 2,543,898; 1,677,862 and 633,445. In the rotary drum structures disclosed in these patents, elements of unlike characteristics are separated from each other, while elements of like characteristics are deliberately kept together; the task of separating elements of identical physical characteristics is not contemplated in such prior art.

U.S. Pat. No. 3,759,419, on the other hand, does provide a rotary housing for progressively separating individual elements of identical characteristics from a mass of such elements. However, the device of this patent requires the alignment of all the elements in a substantially parallel relationship for feeding, one at a time, to an exit port gained by means of a centrifugal force of a certain amplitude. Steel fibers of the type used in fiber concrete are notoriously prone to cling to one another in random orientation when a large number thereof are placed in close proximity, such as the contents of the common forty-pound box of such fibers referred to above, and prior to the invention of the apparatus disclosed herein, only manual separation of the fibers has proved effective, if not economical.

Another prior art device utilizing a rotary drum to dispense a plurality of identical articles is disclosed in U.S. Pat. No. 2,040,747. In this device, a plurality of identical headed tacks fall into each of a plurality of pockets spaced apart around the periphery of one end of a rotary drum as the latter is rotated and the spaced-apart pockets come, in turn, to a bottom position. As the drum continues to rotate, the plurality of tacks in each such pocket are carried upwardly thereby, still within the confines of the drum, to an upper position at which they fall into a hopper extending into the drum. This hopper feeds the tacks into a chute, with a vertical alignment of the tacks necessarily being accomplished at this point in order to permit the tacks to ride down the vibratory chute and exit from the drum through the end opening therein through which the drum is charged with a supply of tacks, this being the only opening from the interior of the drum. Tacks which do not properly align themselves for an acceptance by the vibratory chute are brushed off and dropped back down to the bottom of the drum to repeat the cycle.

While the device described in the preceding paragraph, as well as the others described above, bears some superficial resemblance to the apparatus of the present invention, it differs materially from that of the present invention in both structure and function. In short, the device described in the preceding paragraph, as well as the others previously referred to, cannot perform the function or produce the results of that of the present invention.

SUMMARY OF THE INVENTION

In accordance with the present invention, a mass of intertwined and "balled-up" steel fibers of this type may easily and reliably be separated in a progressive and continuous manner, with the fibers being peeled off or separated from the mass and then being dispensed in a continuous and controlled manner to the vessel containing the cement mix for an even and controlled distribution therein.

This desirable result is achieved in accordance with the present invention by subjecting the intermingled mass of fibers to a continuous tumbling action, which causes fibers at the top of the mass at any given instant to automatically and continuously become separated from the clinging mass and to then fall (as the mass continues to tumble) to a position below the mass at which position the apparatus supporting the mass and effecting the tumbling action provides a continuous and uninterrupted passage of contiguous dispensing apertures for permitting the escape of the separated fibers in a continuous manner.

More specifically, rotary drum means are employed to tumble the mass of fibers, such rotary drum means including a plurality of substantially contiguous apertures disposed about the drum surface in a continuous annulus at that portion of the drum at which the mass of fibers positions itself by gravity. Below this position, and externally of the drum, a dispensing spout catches the falling stream of separated articles and feeds them to a discharge point.

BRIEF DESCRIPTION OF THE DRAWINGS

The invention itself will now be described in connection with the preferred embodiment thereof, given by way of example, and not of limitation, in connection with the accompanying drawings, in which.

DESCRIPTION OF THE INVENTION

Figure 1:
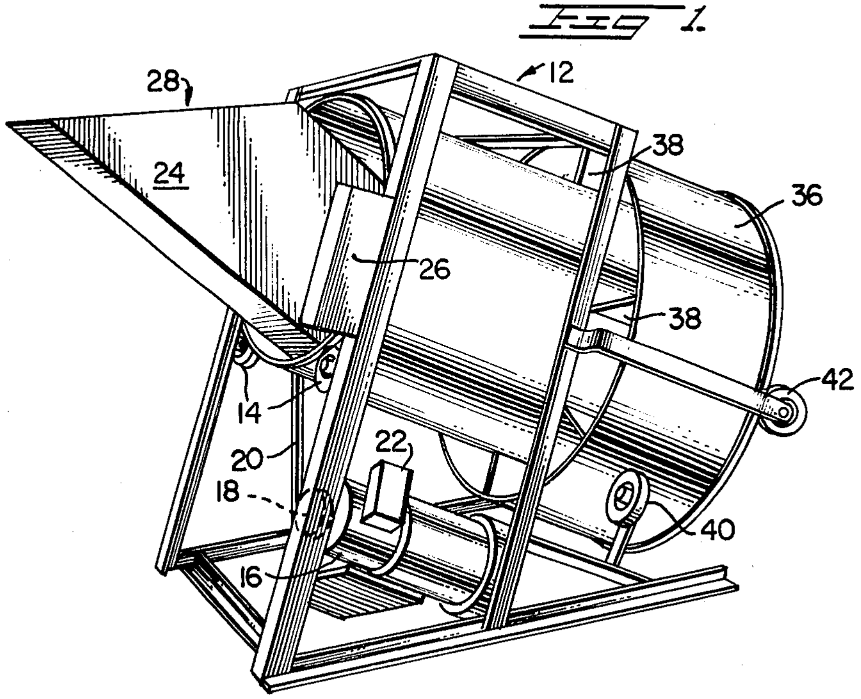
FIG. 1 is a perspective view of the overall apparatus of the present invention.

FIG. 1 shows the overall apparatus of the invention, including a rotary drum 10 supported for rotation within a framework 12 by a plurality of wheels or rollers 14 which are mounted on and are supported by the framework 12 in any suitable manner. Rotation of the drum 10 is effected by an electrical motor 16 which drives a pulley 18 which, in turn, drives an endless belt 20 which passes around pulley 18 and drum 10. A control box 22 for the motor 16 may be provided, this control box conveniently including an on-off switch and a speed control to be referred to in connection with the discussion of FIG. 4.

An input hopper 24 is also mounted, by any suitable means such as flanges 26, on the framework 12, the hopper 24 having an open or input end 28 easily accessible to an operator for charging the apparatus with the material to be processed. The opposite or output end 30 (FIG. 2) of the hopper 24 is positioned within drum 10, so that articles placed within the hopper 24 at the input end 28 thereof fall by gravity through the hopper and into the drum 10 at the input or ingress end 32 thereof (see FIG. 2).

At the output or egress end 34 of the drum, a dispensing spout 36, in the form of an annular collar or sleeve in this embodiment, is mounted on the drum 10 by any suitable means, such as flanges 38. The dispensing spout 36 thus rotates with the drum 10 and is mounted for such rotation by means of wheels or rollers 40 which are mounted on framework 12 by any suitable means. Also mounted on framework 12 and in rolling contact with the dispensing spout 36 are a pair of wheels or rollers 42, one on each side of the apparatus, in contact with the rim of dispensing spout 36 as shown. In this manner, the drum 10 and the spout 36 are held in place with respect to framework 12, being mounted for rotation by means of wheels or rollers 14 and 40, and being held in place axially by means of wheels or rollers 42.

Figure 2:
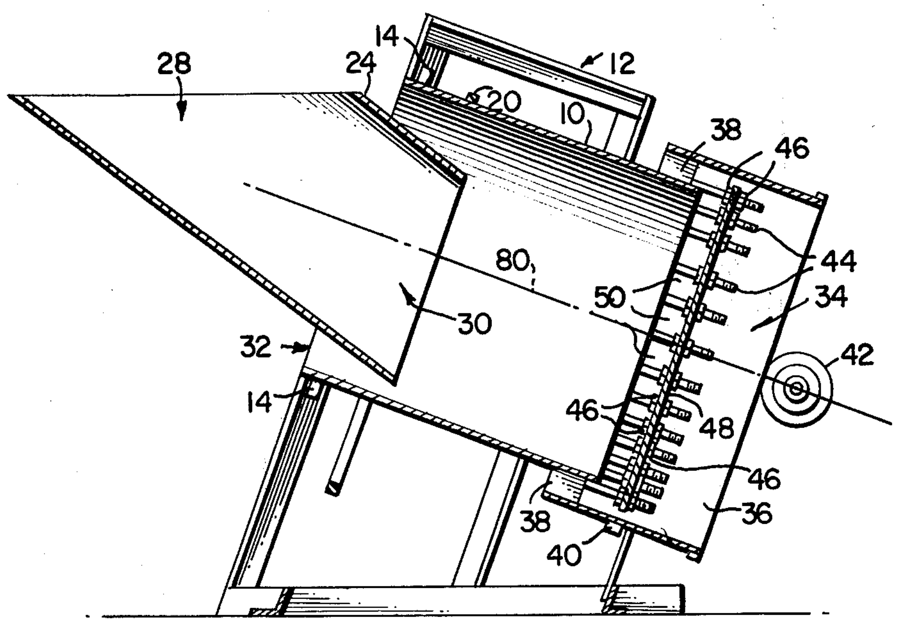
FIG. 2 is a vertical central section view of the apparatus of FIG. 1.

FIG. 2 shows the apparatus of the preferred embodiment in vertical central section, disclosing in greater detail the parts already referred to. In addition, the structure at the output or egress end 34 of drum 10 is shown in greater detail in FIG. 2, this structure forming the dispensing apertures of the apparatus. More particularly, the output or egress end 34 of drum 10 is preferably formed into a large number of parallel fingers 44, which may be formed by a cutting away of the material of drum 10 at those portions which ultimately form the spaces between the fingers 44; obviously, any other suitable means of forming the fingers may be employed. In this connection, it is preferable that the fingers 44 be substantially round in cross section, and that selected ones of the fingers be threaded (as shown in FIG. 2) for acceptance of a plurality of nuts 46 which may be utilized to adjustably position and firmly clamp a closure disc 48, such disc being slightly larger in diameter than the drum 10 and having a plurality of apertures arranged in a circle near the periphery thereof for acceptance of the plurality of fingers 44. That is to say, when the closure disc 48 is mounted on drum 10, each of the longitudinally extending fingers 44 passes through a respective matching aperture in the closure disc 48 for mounting the disc on the drum at a selectable position longitudinally thereof. As shown in FIG. 2, the means for positioning the closure disc longitudinally of the drum 10 constitutes the nuts 46 matched in pairs on opposed sides of the closure disc 48 on those of the fingers 44 which are threaded. In this manner, the inner nuts 46 may be placed in a common plane at a desired position longitudinally of the drum 10, the closure disc 48 being placed against the inner nuts so positioned and then the outer nuts 46 being tightened up to firmly clamp the closure disc 48 at the desired position, thus defining a plurality of equal and substantially contiguous dispensing apertures 50 around the circumference of the drum 10. The apertures 50, irrespective of the selected length thereof, form a continuous annulus of substantially contiguous apertures at or adjacent the egress end 34 of the drum 10 and adjacent the inner face of the closure disc 48. As is apparent, the variable or selectable positioning of this closure disc is a convenient means for governing the rate of dispensing of articles from within the drum 10, this selectable positioning of the closure disc 48 serving to vary as desired the length (and, accordingly, the size) of the dispensing apertures 50; the more remote the closure disc 48 is from the ingress end 32 of drum 10, the larger are the dispensing apertures 50 and the more rapidly the dispensing of articles from within drum 10 will take place. Conversely, positioning of the closure disc 48 closer to the ingress end 32 of drum 10 will reduce the size of the apertures 50 and result in a slower dispensing rate for a given speed of rotation of the drum 10.

Figure 3:
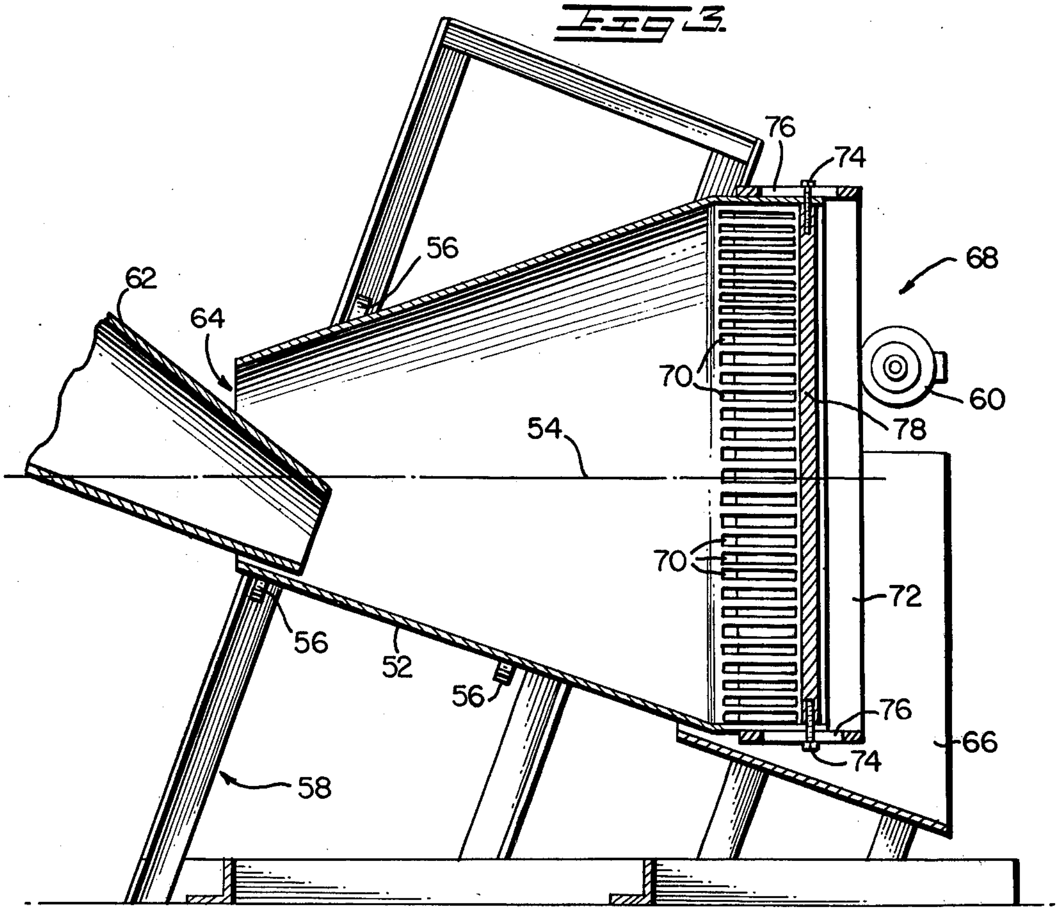
FIG. 3 is a vertical central section view similar to FIG. 2, but showing an alternate embodiment of the apparatus of the present invention, several of the different structural features in FIGS. 1 and 3 being interchangeable and equally applicable to either embodiment.

FIG. 3 shows in vertical central section an alternate embodiment of the apparatus of the present invention, disclosing several structural variations in comparison with the structure of FIGS. 1 and 2, but as will be appreciated by those skilled in the art, several of the elements shown only in FIG. 3 may equally well be employed in connection with the embodiment of FIGS. 1 and 2, and vice versa. In FIG. 3, a rotary drum 52 of truncated frustoconical shape is mounted for rotation about a horizontal axis 54 by means of a plurality of wheels or rollers 56 suitably mounted upon a framework 58. A plurality of similar wheels or rollers 60, also mounted on framework 58 may be utilized to bear against the terminal end of the rotary assembly to retain the same in position with respect to framework 58.

An input hopper 62 is mounted on framework 58 at the input or ingress end 64 of drum 52 for charging the drum with articles to be separated and dispensed, and a stationary output or dispensing spout 66 is mounted on framework 58 at a position underlying the output or egress end 68 of drum 52. The dispensing spout 66 may take any convenient form, and as shown in FIG. 3, the spout may constitute approximately one half of a truncated conical structure. Whatever the form of spout 66, it should underlie the egress end 68 of drum 52 and form a convenient means for conveying articles dispensed from the drum into the end-use vessel.

Adjacent the egress end 68 of drum 52 are a plurality of dispensing apertures 70 selectable portions of which may be covered or blocked by means of an annular collar or sleeve 72 which is mounted on the egress end 68 of drum 52 by any convenient means, such as threaded connectors 74. These threaded connectors 74 pass through adjustment slots 76 in the sleeve 72 to engage the cylindrical end of the drum 52 and, as well, the circular disc closure plate 78, which closes the egress end 68 of drum 52. As will be apparent, loosening of the threaded connectors 74 permits longitudinal adjustment of the position of the collar or sleeve 72 to vary the size of the openings of the apertures 70 to, in turn, control the rate of dispensing of articles through the apertures.

As is evident, the sliding adjustment sleeve 72 of FIG. 3 could equally well be utilized in connection with drum 10 of FIG. 2, and the adjustably positioned closure disc 48 of FIG. 2 could be utilized in connection with the conical drum 52 of FIG. 3. Further, the stationary output or dispensing spout 66 of FIG. 3 could be utilized in place of the rotary dispensing spout 36 of FIG. 2, and vice versa, with suitable rearrangement of the supporting rollers and the like.

In the operation of the apparatus of the present invention, irrespective of whether the rotating drum is cylindrical and has an axis of rotation 80 inclined to the horizontal or, alternatively, the rotating drum is frustoconical and has a horizontal axis of rotation 54, an intermingled clinging mass of steel fibers or other small, rigid, elongate articles is introduced into the rotary drum through the input hopper and slides down the lower portion of the inner face of the rotating drum by gravity to a point adjacent the closed egress end of the drum. Upon continued rotation of the drum, the mass of tangled fibers or the like is continuously tumbled about itself. In accordance with the present invention, it has been found that this tumbling of an intermingled mass of such fibers results in individual fibers at the top of the mass being automatically loosened therefrom in a gradual and continuous manner. These fibers then fall toward the dispensing apertures of the drum as they are loosened from the mass of fibers, falling through the dispensing apertures at a rate dependent upon the speed of rotation of the drum and the size of the dispensing apertures relative to the size of the fibers or other elements being separated and dispensed. Increasing the rotational speed of the drum results in an increased rate of separation and dispensing, while decreasing the rotational speed of the drum produces a slower separation and output feed. Enlarging the dispensing openings increases the rate of dispensing, for a given speed of rotation, whereas decreasing the size of the openings decreases the dispensing rate. FIGS. 2 and 3 disclose means for selectably varying the size of the dispensing apertures to effect a change of dispensing rate, while FIG. 4 shows a representative system for changing the speed of rotation of the drum.

Figure 4:
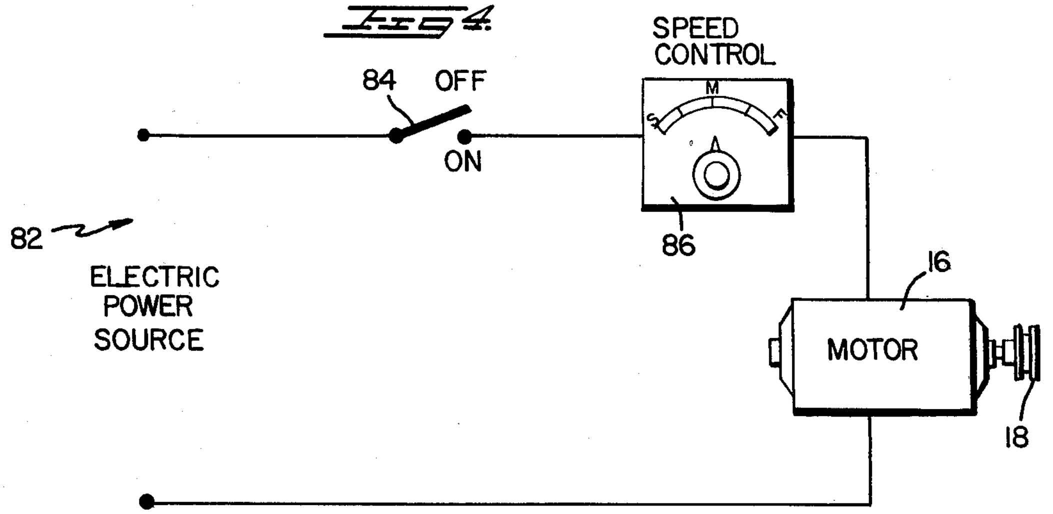
FIG. 4 is schematic electrical diagram, partially in block form, of a representative electrical control circuit for use in connection with the apparatus of the present invention.

In FIG. 4, an electrical power source 82 of any suitable type is connected through an on-off switch 84 and a suitable speed control device 86 to motor 16 driving pulley 18 which engages endless belt 20 (FIGS. 1 and 2) to rotate the drum. The speed control means 86 may be of any type known in the art compatible with the particular type of motor and power source chosen. Obviously, a mechanical variable-speed gearing arrangement may also be employed in connection with a fixed-speed electrical motor (or any other suitable rotary power source) for selectably varying the speed of rotation of the drum. Obviously, an even greater range of dispensing rate may be achieved by changing both the speed of rotation of the drum and the size of the apertures in the direction of increased or decreased dispensing rate, while a type of vernier effect may be achieved by changing these two variables in opposite directions.

The invention has been described above in some detail, with particular reference to its application to the separation of steel fibers from a mass of such elements and the dispensing thereof into a cement mix in order to provide an improved fibrous concrete. However, it will be obvious to those skilled in the art that the apparatus of the present invention is readily applicable to the separation and dispensing of other small, rigid, elongate articles of any type which exhibit the tendency to cling to one another in a large tangled mass. As in the case of dispensing steel fibers in the production of fibrous concrete, the apparatus and method of the present invention is particularly well suited to the separation of such small articles from a mass thereof and the even and continuous dispensing of the separated articles into an end product in which it is important to effect a smooth and homogenous mix. That is to say, by means of the apparatus and method of the present invention, fibrous concrete or the like may be produced in which the reinforcing fibers are evenly dispersed throughout the structure formed by virtue of the fact that the fibers were smoothly and continuously dispensed into the mix at a desired and controlled rate. Hence, the invention is not to be considered as limited to the particular details given, nor to the specific application to which reference has been made during the description of the preferred embodiments of the apparatus, except insofar as may be required by the scope of the appended claims.

What is claimed is:

1. A dispensing apparatus for the continuous dispensing of small, rigid, elongate articles, comprising drum means having an internal surface constituting an imperforate surface of revolution with respect to a central axis, means for supporting said drum means for rotation about such axis with the lowermost element of said surface of revolution being inclined downwardly with respect to the horizontal from an ingress end of said drum means to an egress end thereof, closure means for closing said egress end of said drum means, means defining a plurality of substantially contiguous apertures disposed about said otherwise imperforate surface in a substantially continuous annulus adjacent said egress end of said drum means, and a dispensing spout positioned externally of said drum means at the egress end thereof and having at least a portion underlying said annulus of contiguous apertures therein, whereby a plurality of small, rigid, elongate articles placed within said drum means at the ingress end thereof slide downwardly along said imperforate surface of revolution by gravity to said closed egress end upon rotation of said drum means about such axis and tumble over each other at said closed egress end thereof, falling substantially continuously through said plurality of substantially contiguous apertures and into said dispensing spout thereunder.

2. A dispensing apparatus for the continuous dispensing of small, rigid, elongate articles in accordance with claim 1, and including means for rotating said drum means about such axis.

3. A dispensing apparatus for the continuous dispensing of small, rigid, elongate articles in accordance with claim 2, wherein said rotating means includes means for rotating said drum means at a selectable rate to correspondingly regulate the rate of dispensing of such articles through said apertures.

4. A dispensing apparatus for the continuous dispensing of small, rigid, elongate articles in accordance with claim 1, wherein said surface of revolution is a cylindrical surface, and said supporting means support said drum means with such axis inclined with respect to the horizontal.

5. A dispensing apparatus for the continuous dispensing of small, rigid, elongate articles in accordance with claim 1, wherein said surface of revolution is a frustoconical surface, and said supporting means support said drum means with such axis substantially horizontal.

6. A dispensing apparatus for the continuous dispensing of small, rigid, elongate articles in accordance with claim 1, and including means for selectively varying the size of said apertures to correspondingly regulate the rate of dispensing of such articles therethrough.

7. A dispensing apparatus for the continuous dispensing of small, rigid, elongate articles in accordance with claim 1, and including means for selectively varying the size of said apertures in the direction of such axis to correspondingly regulate the rate of dispensing of such articles therethrough.

8. A dispensing apparatus for the continuous dispensing of small, rigid, elongate articles in accordance with claim 7, wherein said means for selectively varying the size of said apertures includes sleeve means adjustably mounted on said drum means in overlapping relationship with respect to said apertures, whereby selectable portions of said apertures may be covered by said sleeve means to correspondingly regulate the rate of dispensing of such articles therethrough.

9. A dispensing apparatus for the continuous dispensing of small, rigid, elongate articles in accordance with claim 7, wherein said aperture-defining means includes said closure means for the egress end of said drum means and a plurality of substantially parallel finger means extending longitudinally from said egress end of said drum means, said closure means for the egress end of said drum means being mounted on said finger means and selectively positionable longitudinally thereof to correspondingly regulate the rate of dispensing of such articles through said apertures.

10. A dispensing apparatus for the continuous dispensing a small, rigid, elongate articles in accordance with claim 1, and including hopper means mounted on said drum-supporting means adjacent said ingress end of said drum means for feeding such articles thereto.

11. A dispensing apparatus for the continuous dispensing of small, rigid, elongate articles in accordance with claim 1, wherein said dispensing spout comprises an annular collar positioned around but spaced from such annulus of apertures in said drum means.

12. A dispensing apparatus for the continuous dispensing of small, rigid, elongate articles in accordance with claim 11, wherein said dispensing spout collar is mounted for rotation with said drum means.

13. The method of separating small, rigid, elongate articles from a mass thereof, comprising:

supporting such mass of articles against gravity for sliding movement together down an inclined path to a common delivery point, precluding further sliding movement of such mass of articles in the direction of said inclined path past said common delivery point, rotating such mass of articles in a vertical plane concomitantly with said sliding motion down such inclined plane and at said common delivery point, and collecting such articles as they sequentially become separated from the mass as they pass over the top thereof and fall vertically downwardly therefrom by gravity solely at said common delivery point.

* * * * *